United States Patent [19]

Mayginnes et al.

[11] Patent Number: 5,001,756
[45] Date of Patent: Mar. 19, 1991

[54] DECRYPTION DEVICE WITH VARIABLE CLOCK

[75] Inventors: Kevin B. Mayginnes; Bruce D. Oberlies, both of Fort Worth, Tex.

[73] Assignee: Motorola, Inc., Schaumburg, Ill.

[21] Appl. No.: 393,359

[22] Filed: Aug. 11, 1989

[51] Int. Cl.$^5$ ............................................. H04L 9/02
[52] U.S. Cl. ..................................... 380/48; 380/49; 375/110
[58] Field of Search ........................... 380/42, 48, 49; 375/110, 108

[56] References Cited

U.S. PATENT DOCUMENTS

| | | | |
|---|---|---|---|
| 3,404,233 | 10/1968 | Mason et al. | 375/110 X |
| 4,229,699 | 10/1980 | Frissell | 375/108 X |
| 4,242,755 | 12/1980 | Gauzan | 375/110 X |
| 4,763,357 | 8/1988 | Barr | 380/48 |

FOREIGN PATENT DOCUMENTS

| | | | |
|---|---|---|---|
| 0209079 | 1/1987 | European Pat. Off. | 380/49 |
| 0273289 | 7/1988 | European Pat. Off. | 380/48 |

Primary Examiner—Thomas H. Tarcza
Assistant Examiner—Tod Swann
Attorney, Agent, or Firm—Steven G. Parmelee

[57] ABSTRACT

A decryption device wherein an encryption/decryption module can be operated at various clock speeds, and wherein an associated processor controls these clock speeds depending upon the moment to moment processing interrelationship between the encryption/decryption module and the processor. In particular, when loading a new key into the encryption module, or when utilizing the encryption module to decrypt an encrypted new key, the processor alters the usual clock rate for the encryption module.

1 Claim, 1 Drawing Sheet

DECRYPTION DEVICE WITH VARIABLE CLOCK

TECHNICAL FIELD

This invention relates generally to decryption devices, and particularly to radios capable of transmitting and receiving encrypted messages.

BACKGROUND ART

Two-way radios capable of sourcing and receiving encrypted messages are known in the art. Typically, such radios operate by encrypting an original sourced information signal as a function of at least one cipher key. Generally, this requires initial digitization of the original message (if the original message was analog, such as a voice message). The digitized version of the original message can then be enciphored in an appropriate manner as a function of the cipher key.

In a number of known radios, the enciphored digitized message is processed at a 12 kbs clock rate.

For certain applications, it would be desirable to provide an encryption capable radio with multiple cipher keys. So configured, the radio would be equipped to encrypt, or decrypt, messages in accordance with more than one key as appropriate to a particular communication. In order to accommodate such a configuration, however, the encryption mechanism must be loaded with the key of choice. The loading of such a key will ordinarily be managed by an associated processor in the radio. The encryption mechanism will need to receive and process the loading of the key at its ordinary encryption/decryption clock rate; for instance, 12 kbs. For many processors, however, accommodating the encryption mechanism in this regard may lead to real time problems, as this clock rate may be incompatible with its other tasks and requirements. Although a more powerful processor could be utilized, provision of such an enhanced microprocessor represents increased cost and potentially increased complexity.

There exists a need for a methodology for allowing an encryption device to be loaded with a new key while simultaneously imposing minimum requirements on an associated processor that manages loading of the key.

SUMMARY OF THE INVENTION

This need and others are substantially met through provision of the decryption device disclosed herein. This device includes generally an input for receiving an encrypted signal and for providing a recovered clock signal. The decryption device also includes a decryption mechanism that is coupled to the input and that decrypts the received encrypted signal as a function, at least in part, of a cipher key and the recovered clock signal. Lastly, the invention contemplates provision of a control unit that provides an alternate clock signal, different from the recovered clock signal, and that controls provision of the clock signals to the decryption mechanism to thereby selectively control the processing rate of the decryption mechanism.

In one embodiment, the key is provided from a processor to the encryption mechanism, and the processor, when providing the key, utilizes the alternate clock signal to ensure compatibility between the operating capabilities of the processor and its other tasks.

In another embodiment, the key is provided to the encryption mechanism in an encrypted form, and the decryption mechanism functions, prior to installing the new key, to decrypt the new key to a decryption rate governed by the clock signal as provided thereto by the control unit.

BEST MODE FOR CARRYING OUT THE INVENITON

Figure 1:
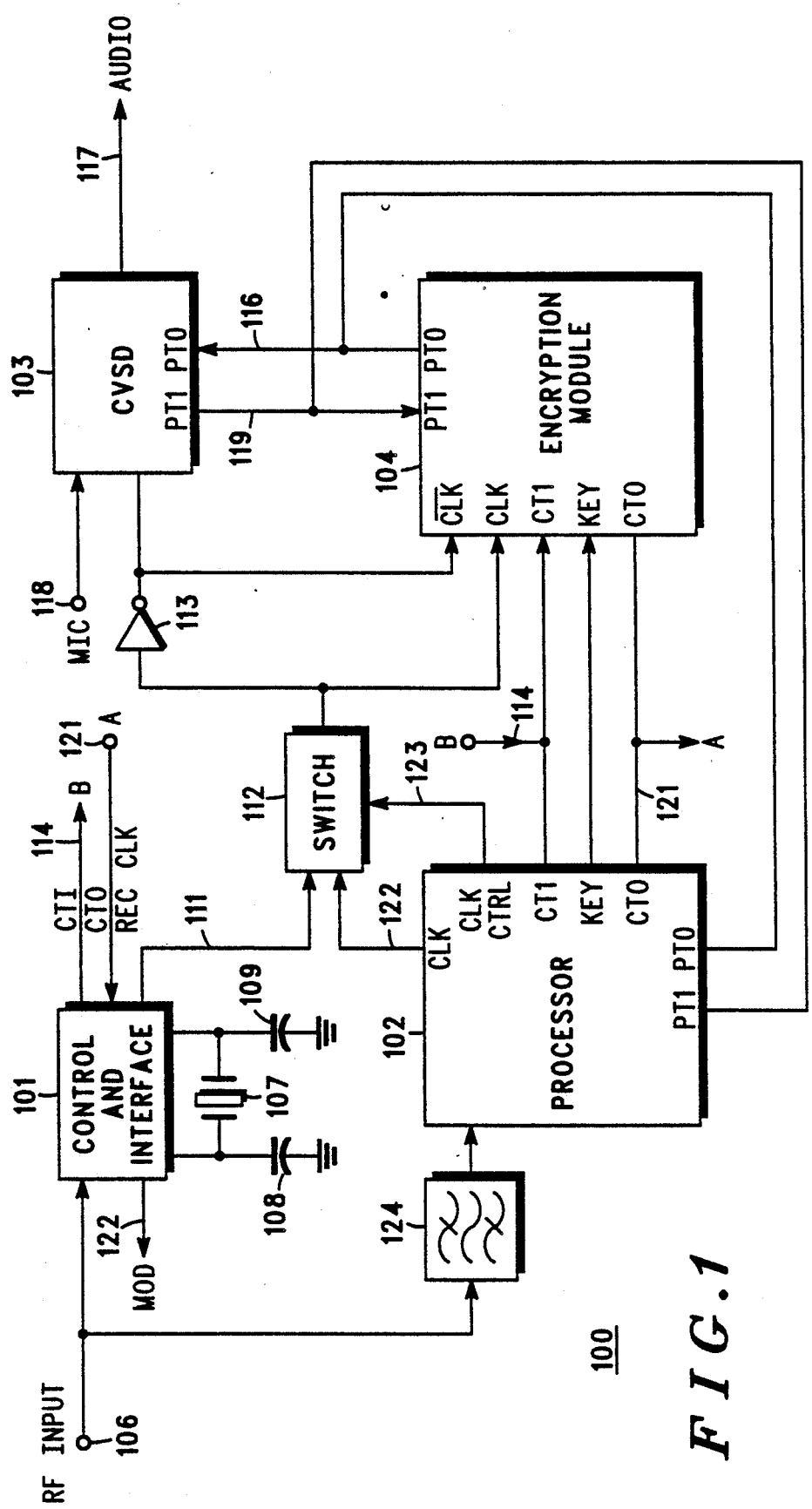
FIG. 1 comprises a block diagram depiction of a radio constucted in accordance with the invention.

The invention can be seen in FIG. 1 as depicted generally by the numeral 100. In this particular embodiment, the invention resides in an encryption capable radio, which radio includes a control and interface unit (101), a processor (102), a Continuously Variable Slope Delta modem (CVSD) (103), and an encryption module (104). Each of these generally referred to components, along with appropriate peripheral or interconnecting devices, will be described in more detail in seriatim fashion below.

The control and interface unit (101) functions, in part, to receive baseband message information as received from an appropriate RF unit (not shown) at an appropriate RF input (106). The control interface unit (101) also couples to an appropriate crystal (107) and grounded capacitors (108 and 109) to derive a reference signal utilized by the control and interface unit (101) in carrying out its processing.

The control and interface unit (101) functions to recover the encrypted message provided at the input thereto, and to provide this cipher-text-in (CTI) information to the encryption module (104). The control and interface unit (101) also functions to recover a recovered clock signal (111) and to provide that recovered clock signal (111) through a switch (112) to the encryption module (104) and also through an inverting gate (113) to the CVSD module (103). Both the encryption module (104) and the CVSD module (103) use this recovered clock signal (111) to control their processing activities. In this particular embodiment, it may be presumed that the recovered clock signal will ordinarily be a 12 kbs clock signal.

The CTI signal (114) as provided by the control and interface unit (101) to the encryption module (104) is deciphered by the encryption module (104) as a function of a cipher key stored in the encryption module (104). The resultant plain-text-out (PTO) message (116) is then provided to the CVSD module (104) to allow reconversion of the PTO signal into an analog signal that can be provided to an appropriate audio transducer (117) (not shown).

In order to provide for encryption capabilities, input analog messages, such as a speech signal, can be provided via a microphone (118) (not shown) to the CVSD module (103) which digitizes that signal. The resultant plain-text-in (PTI) digital signal (119) is then provided to the encryption module (104). The encryption module (104) encrypts the PTI message as a function of the stored encipher key, and provides the resultant cipher-text-out (CTO) signal (121) to the control and interface unit (104). The control and interface unit (101) then provides this signal to an appropriate modulation mechanism (122) (not shown) to allow the enciphored message to modulate an appropriate carrier signal and to provide for subsequent transmission of the enciphored signal to an intended receiver.

From time to time, it may be appropriate to provide the encryption module (104) with a new key. This can be accomplished in accordance with this invention in a number of ways. For example, the processor (102) may store an additional key, either in resident memory or in an associated memory unit (not shown). This new key can be provided to the encryption module (104) through a key loading port (KEY). When loading the key in this manner, it may be appropriate to alter the clock rate at which the encryption module operates in order to remain compatible with the processing capabilities of the processor (102). To meet this need, the processor (102) provides a second clock signal (122) through the switch (112) to the clock input of the encryption module (104). The switch (112) can then be caused to provide the second clock signal (122), as versus the recovered clock signal (111), by provision of a clock control signal (123) as sourced from the processor (102). So configured, the encryption module (104) will process the key loading activity at a clock rate as determined and controlled by the processor (102), thereby ensuring compatibility between the processor (102) and the encryption module (104).

In another embodiment, the new key may be provided to the processor (102) via the RF link. In particular, the new key information may be received at the RF input (106) and provided to the processor (102) after appropriate filtering (124). This new key can then be provided to the encryption module (104) in the manner described above.

In yet another embodiment, the key can be provided to the processor (102) in the manner described above in an encrypted form. If the new encrypted key is encrypted as a function of the key already stored in the encryption module, the processor (102) can alter the clock signal as provided to the encryption module (104) as described above, and then provide the encrypted key to the encryption module (104) via the CTI line. The encryption module (104) will then decrypt the new key, and provide the unencrypted key at its PTO (116) port. The processor will receive this decrypted key, and can thereafter provide the new key to the encryption module (104) pursuant to the key loading procedure described above. Upon completion of the key loading activity, the processor (102) can cause the switch (112) to again provide the recovered clock signal to the encryption module (104) to facilitate subsequent processing.

In yet another embodiment, the new key can be provided to the processor (102) in an encrypted manner as described above, with the exception that the new key is encrypted as a function of a shadow key, and not as a function of the current key in use by the encryption module (104). In this embodiment, the shadow key is stored by the processor (102). When the new key is provided to the processor (102) in the manner described above, the processor loads the shadow key into the encryption module (104) as described above, and then provides the encrypted new key to the encryption module (104) to allow the encryption module to decrypt the new key as a function of the shadow key. Once decrypted, the unencrypted new key will be provided to the processor (102), which then provides the new key to the encryption module (104) in accordance with the key loading procedures described above. The encryption module (104) will thereafter function to decrypt incoming messages as a function of the new key, and the processor (102) can cause the switch (112) to again provide the recovered clock signal to the encryption module (104) to allow normal operation of the encryption module (104).

What is claimed is:

1. In a decryption device having:
   (A) input means for receiving an encrypted signal and for providing a recovered clock signal;
   (B) decryption means coupled to the input means for decrypting the encrypted signal using a key and the recovered clock signal;
   an improvement comprising control means for providing an alternate clock signal that is different from the recovered clock signal and for controlling provision of the recovered clock signal and the alternate clock signal to the decryption means to thereby selectively control a rate of operation of the decryption means.

* * * * *